United States Patent
Kowles et al.

(10) Patent No.: US 9,772,782 B2
(45) Date of Patent: Sep. 26, 2017

(54) NON-VOLATILE COMPLEMENT DATA CACHE

(71) Applicant: Seagate Technology LLC, Cupertino, CA (US)

(72) Inventors: Andrew Kowles, Lyons, CO (US); Timothy Feldman, Louisville, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 328 days.

(21) Appl. No.: 14/284,264

(22) Filed: May 21, 2014

(65) Prior Publication Data

US 2015/0339066 A1    Nov. 26, 2015

(51) Int. Cl.

| G06F 3/06 | (2006.01) |
|---|---|
| G06F 12/0868 | (2016.01) |
| G06F 12/08 | (2016.01) |
| G06F 12/06 | (2006.01) |
| G06F 12/0804 | (2016.01) |

(52) U.S. Cl.
CPC .............. *G06F 3/0619* (2013.01); *G06F 3/06* (2013.01); *G06F 3/065* (2013.01); *G06F 3/0623* (2013.01); *G06F 3/0656* (2013.01); *G06F 3/0659* (2013.01); *G06F 3/0671* (2013.01); *G06F 3/0676* (2013.01); *G06F 3/0679* (2013.01); *G06F 12/0638* (2013.01); *G06F 12/08* (2013.01); *G06F 12/0804* (2013.01); *G06F 12/0868* (2013.01); *G06F 2206/1014* (2013.01); *G06F 2212/222* (2013.01); *G06F 2212/604* (2013.01)

(58) Field of Classification Search
CPC .......... G06F 3/06; G06F 3/0619; G06F 3/065; G06F 3/0656; G06F 3/0659; G06F 3/0676; G06F 3/0679; G06F 2212/222; G06F 2212/604; G06F 12/08; G06F 12/0804; G06F 12/0868; G06F 3/0623; G06F 3/0671; G06F 2206/1014

USPC .......................................................... 711/103
See application file for complete search history.

(56) References Cited

U.S. PATENT DOCUMENTS

| 5,361,391 | A | 11/1994 | Westberg |
| 6,516,426 | B1* | 2/2003 | Forehand ............ G06F 12/0866 711/113 |
| 6,795,890 | B1* | 9/2004 | Sugai .................... G11C 16/102 365/185.29 |
| 7,965,465 | B2 | 6/2011 | Sanvido et al. |
| 8,495,300 | B2 | 7/2013 | Ng et al. |

(Continued)

OTHER PUBLICATIONS

Parker, D. E., "CS 5470: Compiler Principles and Techniques—Lecture 32", Apr. 16, 2010, hosted online by College of Engineering, University of Utah.*

(Continued)

*Primary Examiner* — Reginald Bragdon
*Assistant Examiner* — Aaron D Ho
(74) *Attorney, Agent, or Firm* — Holzer Patel Drennan

(57) ABSTRACT

The disclosed systems include features to mitigate a risk of data corruption attributable to unexpected power loss events. In particular, the disclosed system identifies and retrieves complement data associated with each received write command and stores the complement data in a non-volatile cache while the complement data is overwritten via execution of the write command.

15 Claims, 4 Drawing Sheets

(56) References Cited

U.S. PATENT DOCUMENTS

| | | | |
|---|---|---|---|
| 8,661,193 B1* | 2/2014 | Cobos | G11B 20/10 |
| | | | 711/100 |
| 8,879,183 B1* | 11/2014 | Weikal | G11B 5/09 |
| | | | 360/48 |
| 2006/0136765 A1 | 6/2006 | Poisner et al. | |
| 2008/0022164 A1* | 1/2008 | Takahashi | G11B 20/1883 |
| | | | 714/710 |
| 2011/0026328 A1* | 2/2011 | Moshayedi | G11O 5/141 |
| | | | 365/185.18 |
| 2012/0102261 A1* | 4/2012 | Burger | G06F 12/0866 |
| | | | 711/103 |
| 2014/0059270 A1* | 2/2014 | Zaltsman | G06F 3/061 |
| | | | 711/103 |
| 2014/0098438 A1* | 4/2014 | Poudyal | G11B 5/012 |
| | | | 360/55 |
| 2015/0324292 A1* | 11/2015 | Krishnaiyer | G06F 12/0862 |
| | | | 711/137 |

OTHER PUBLICATIONS

K. S. Venkataraman, T. Zhang, W. Zhao, H. Sun and N. Zheng, "Scheduling Algorithms for Handling Updates in Shingled Magnetic Recording," Networking, Architecture and Storage (NAS), 2013 IEEE Eighth International Conference on, Xi'an, 2013, pp. 205-214.*

* cited by examiner

NON-VOLATILE COMPLEMENT DATA CACHE

BACKGROUND

In some data storage systems, modifying a small amount of data on a storage media entails a re-write of additional unmodified data. For example, a hard drive assembly may write data to a magnetic media in units of sectors that are larger than data blocks received from a host device. As a result, recording an individual data block received from a host may entail a re-write of an entire sector on the magnetic media. Similarly, shingled magnetic recording (SMR) systems typically re-write a group of data tracks whenever one or more data cells within the group are changed. In these types of systems, a write operation interrupted by a power failure can result in corrupted or unrecoverable data.

SUMMARY

Implementations described and claimed herein preserve data during unexpected power loss events by reading, from a storage medium, data associated with a received write command; and caching at least a portion of the read data to a non-volatile data cache of the storage device prior to execution of the write command. The cached data includes complement data and excludes data that is modified by execution of the write operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Data storage devices can experience power loss events that create problems with data integrity. Intelligent management of those power loss events can increase the reliability of storage devices.

Figure 1:
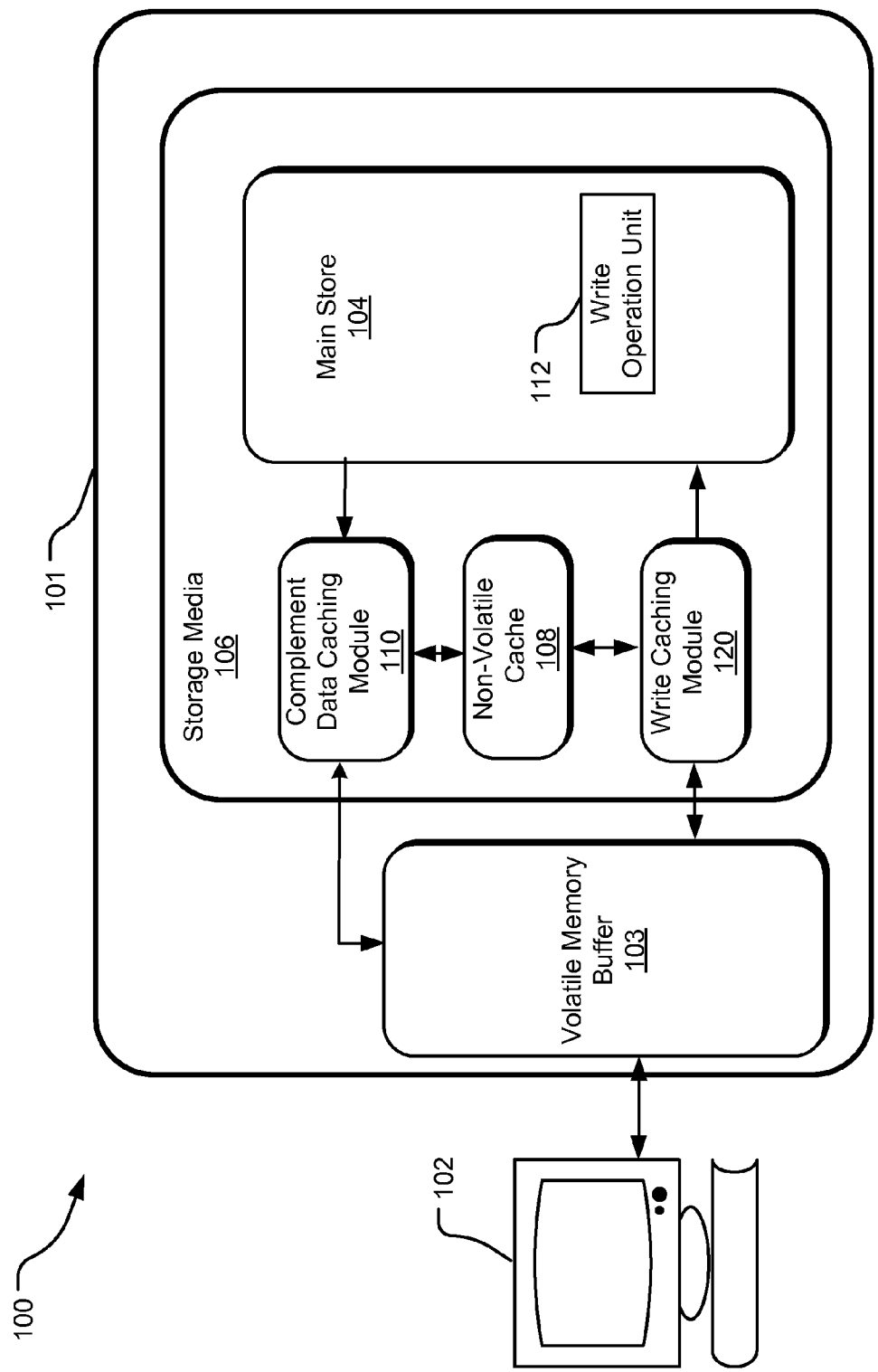
FIG. 1 illustrates an example storage system that uses a read caching module for preservation of complement data during unexpected power loss events.

FIG. 1 illustrates an example storage system 100 that uses a complement data caching module 110 for preservation of complement data during an unexpected power failure event. As used herein, "complement data" refers to data that is re-written and unchanged during execution of a write operation that modifies one or more data cells on a storage media. The storage system 100 includes a host computer 102 that sends one or more read or write commands to a storage device 101. The storage device 101 further includes a storage media 106 having a number of data blocks that can each hold a set number of storage bytes. The write commands from the host computer 102 to the storage device 101 specify new data to overwrite data previously stored in one or more data blocks on the storage media 106. The storage media 106 may be one or more of a variety of tangible media (excluding carrier waves and communication signals) including, for example, magnetic media, solid state drives, flash memory, optical storage discs, random access memory (RAM), and the like.

Storage space on the storage media 106 includes at least a main store 104 and a non-volatile cache 108. The main store 104 is a storage region reserved for storage of user data with a storage capacity equal to the reported capacity of the system (e.g., the capacity advertised to an end user). The non-volatile cache 108 is either a storage area on the storage media 106 and/or another non-volatile memory accessible by the storage device 101. In one implementation, the non-volatile cache 108 is separate from (e.g., does not overlap) the main store 104. For example, the non-volatile cache 108 may be included in an overprovisioned region separate from the main store 104. Some implementations may cache data in one or more separate storage regions of multiple types of non-volatile memory and/or volatile memory.

In one implementation, the non-volatile cache 108 is a write cache used for temporary data storage of new data received from the host computer 102 before the new data is written to a more permanent location in the main store 104. In the same or another implementation, the non-volatile cache 108 is a complement data cache that stores a copy of complement data from the main store 104 while such data is being re-written (e.g., overwritten) in the main store 104.

During a write operation, the storage device 101 writes data to one or more independently writeable units of storage on the storage media 106, herein referred to as "write operation units" (e.g., an write operation unit 112). Independently writeable units of storage are units that can be updated without changing the data elsewhere on the media. In some implementations, the write operation unit 112 is a contiguous unit of storage. The write operation unit 112 is contiguous when, for example, all of the data storage space in the write operation unit 112 can be written to in a single continuous write operation that does not entail radial movement of an actuator arm other than to allow normal track switches between adjacent data tracks. Examples of write operation units that are contiguous include without limitation an individual data sector, multiple adjacent sectors along a same data track, a data track, (e.g., a concentric data track on a magnetic media) or multiple adjacent data tracks. The write operation unit 112 may also be larger or smaller than the examples provided herein.

In some implementations, the write operation unit 112 is not a contiguous unit of storage. For example, a write operation unit may include a number of non-contiguous data blocks that are affected (but not necessarily modified) by a write operation, such as a number of radially aligned sectors. This idea explained further below with respect to shingled magnetic recording systems.

In still other implementations, the write operation unit 112 is an erasure block or a set of erasure blocks on a Flash storage device. In other implementations, the write operation unit 112 is one or more data blocks of resistive random access memory (ReRaM), spin transfer torque magnetoresistive random access memory (STT-MRAM), non-volatile dynamic random access memory (NV-DRAM), etc.

When the storage device 101 executes a write command specifying new data to be written to the write operation unit 112, the write operation unit 112 is fully re-written even if the new data received is much smaller than the total amount of data stored in the write operation unit 112. Therefore, execution of the write command entails reading data of the write operation unit 112 into a volatile memory buffer 103 and modifying the data to include one or more changed cells (e.g., the new data), so that a modified version of the write operation unit 112 can be subsequently written back to the original location of the write operation unit 112 on the storage media 106.

In some implementations, the size of the write operation unit 112 differs from the size of data blocks sent to the storage device 101 by the host computer 102. Due to error correction coding (ECC) typically embedded within each data sector on a magnetic media, a data sector is generally updated as a whole unit rather than piecemeal. Therefore, the write operation unit 112 may be a sector, and the host computer 102 may receive and send data to the storage device 101 in host-size data blocks that are smaller than a sector. In one implementation, the write operation unit 112 is a 4096-byte (4-KiB) sector, and each of the host-size data blocks is 512 B (i.e., one eighth of the size of the sector). In this type of system, an update to a 512-byte host-size data block entails a rewrite of an entire 4096-byte data sector. Therefore, the "new data" (e.g., the new 512-byte data block) is written to the storage media 106 along with a re-write of 3584 bytes (3.5 KiB) of unchanged data (i.e., complement data).

In addition to the example system described above, a number of other types of systems re-write complement data when writing new data to the storage media 106. For example, shingled magnetic recording (SMR) systems also read and write large amounts of complement data to and from the storage media 106 whenever one or more data cells is modified. SMR systems store data in groupings of adjacent data tracks referred to as data bands. Adjacent data bands are separated from one another by isolation regions including one or more unused tracks where no data are written, making each data band independently writeable. When shingling exists in one direction only, a set of ending tracks in a data band are also independently writeable.

In some SMR write operations, the write operation unit 112 is an entire data band. For example, some SMR write operations entail reading an entire data band into memory, modifying one or more of the read data cells, and re-writing the entire data band back to the storage media 106. In other SMR write operations, the write operation unit 112 is less than a full data band. For example, the write operation unit 112 may be a trailing set of data tracks in a data band, such as a contiguously readable portion of a data band that is between a first updated data block and an end of the data band. In still other SMR write operations, the write operation unit 112 is non-contiguous portion of a data band, such as a number of radially aligned data sectors within a band that are affected by a write operation. For example, a write operation modifying data of a first sector in a first track may affect data of an adjacent sector of a second track. Likewise, writing data to the adjacent sector of the second track may affect data of another adjacent sector in a third data track. In such case, the write operation unit may include, for example, the radially aligned sectors of the first, second, and third data track, but not necessarily include other sectors on the first, second, and third data tracks.

If an unexpected power failure occurs during a write operation to the write operation unit 112, data in the volatile memory buffer 103 is lost and data cells in the write operation unit 112 may become corrupted. To mitigate this risk of data loss and/or data corruption, a back-up copy of the data in the write operation unit 112 can be made in non-volatile memory of the storage device 101 prior to execution of the write command. However, backing up data of the write operation unit 112 consumes processor power and can, depending on the storage location of the back-up copy, entail excess actuator arm movement that increases total seek time delays. In addition, excessive accesses of the storage location of the back-up copy can potentially cause wear and lube migration of the media and/or partial erasure of neighboring media. The implementations disclosed herein provide solutions that help to ensure data integrity in the event of unexpected power loss while reducing power consumption and/or total write delays associated with generating and accessing back-up data for restoration processes.

As used herein, an unexpected power loss refers to a power loss that occurs at any time in a non-routine manner. When an unexpected power loss occurs, the storage device 101 may not execute usual shut-down procedures that complete write operations in progress and ensure data integrity. An unexpected power loss may occur, for example, when a user pulls a power plug, when battery life of the storage device 101 expires, or when a connection between the host computer 102 or a power supply and the storage device is suddenly severed or altered.

To address the aforementioned data preservation concerns, the storage system 100 retrieves complement data associated with each write operation and saves a back-up copy of the complement data in non-volatile memory during execution of the write command. The storage system 100 may also save a back-up copy of new data specified by each write command in non-volatile memory during execution of the write command. Data that is modified by a write operation is not copied to non-volatile along with the complement data, effectively reducing processing time. In still another implementation, the new data is saved in close proximity to the complement data, reducing a need for excessive actuator movement.

In one implementation, the host computer 102 sends a write command to the storage device 101 specifying new data to be written to the storage media 106. This new data is absorbed into the volatile memory buffer 103 and copied to a non-volatile cache 108 by a write caching module 120. A complement data caching module 110 identifies a target write location of the write command (e.g., the write operation unit 112) on the storage media 106 and retrieves complement data of the write command from the target write location. The complement data caching module 110 saves the complement data to the non-volatile memory cache 108.

In FIG. 1, both the write caching module 120 and the complement data caching module 110 copy data to the same cache (e.g., the non-volatile cache 108); however, it should be understood that the write caching module 120 and the complement data caching module 110 may be adapted to write data to separate (e.g., non-overlapping) cache storage locations. The two separate cache locations may be on the same storage media or different storage media. In one implementation, one or both of the two separate cache locations are non-stationary; that is, they are assigned to varying locations in the non-volatile cache 108 over time. Non-stationary locations can moderate the disadvantageous effects of excessive accesses to the non-volatile cache 108.

The write caching module 120 and the complement data caching module 110 may be integrated, co-dependent modules or operate independently of one another. Both the complement data caching module 110 and the write caching module 120 may be, for example, hardware and/or software, such as functional modules in firmware of the storage device 101.

Figure 2:
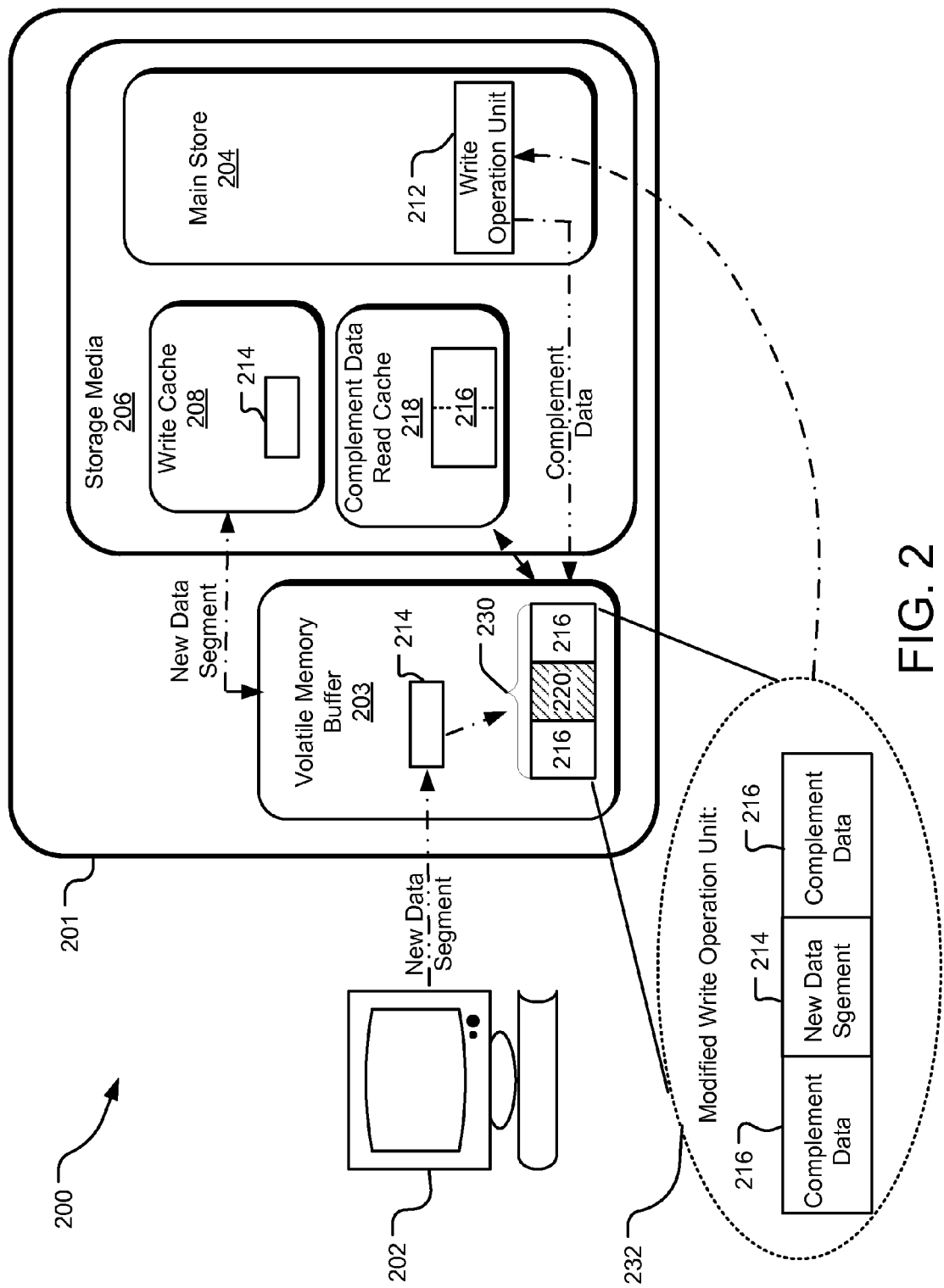
FIG. 2 illustrates example operations of a storage system that preserves complement data during unexpected power loss events.

FIG. 2 illustrates example operations of a storage system 200 that preserves complement data during unexpected power loss events. The storage system 200 includes a host computer 202 communicatively coupled to a storage device 201 and further including a storage media 206. The storage device 201 reads and writes data to the storage media 206 in write operation units (e.g., a write operation unit 212). The write operation unit 212 may be, for example, a sector, a track, multiple data tracks, a set of sectors on multiple data tracks, a Flash erasure block, or multiple Flash erasure blocks.

Storage space on the storage media 206 includes at least a main store 204, which is a data region reserved for storage of user data. The storage device 201 also includes a write cache 208 and a complement data read cache 218 that each includes a storage area that is either on the storage media 206 and/or another non-volatile memory accessible by the storage device 201. In one implementation, the complement data read cache 218 is a region on a magnetic media that is not utilized as a cache until such time that another caching area becomes unusable. For example, solid state memory may be initially used as a caching area where data of a target write operation unit is stored prior to execution of associated write commands. When one or more cells in the solid state memory wear out and become unusable, the complement data read cache 218 (e.g., a disc clone of the caching area) is activated.

In one implementation, the write cache 208 is included within a user-writeable storage area that is separate from the main store 204, such as an overprovisioned storage area. The write cache 208 is a region used for temporary data storage of new data received from the host computer 202. For example, the storage device 201 may temporarily store new data specified by a write command in the write cache 208 before subsequently writing the new data to a more permanent location in the main store 204. Accordingly, functional modules (e.g., software and/or hardware) of the storage device 201 are adapted to move data between the write cache 208 and the main store 204.

The complement data read cache 218 is a cache used for temporary storage of complement data retrieved from a storage region of the main store 204 prior to execution of a write operation to the storage region. In one implementation, the complement data read cache 218 and the write cache 208 are managed separately, such as by different modules that do not interact with one another. In another implementation (e.g., the implementation of FIG. 3), the complement data read cache 218 and the write cache 208 are managed by the same functional module.

To write new data to the storage media 206, the host computer 202 sends a write command to the storage device 201 including the new data and associated storage information. In one implementation, the storage information from the host computer 202 includes the size of the new data and information that can be used to identify one or more target write operation units (e.g., a write operation unit 212) on the storage media 206. The storage device 201 receives the new data and stores it in a volatile memory buffer 203. The new data includes at least one new data segment. As used herein, the term "new data segment" refers to a contiguous data segment that is to be written to an individual write operation unit (e.g., the write operation unit 212) along with complement data.

In the illustrated example, the storage device 201 identifies a new data segment 214 and copies the new data segment from the volatile memory buffer 203 to the write cache 208. Using the storage information from the host device 202, the storage device 201 identifies a target write operation unit (e.g., the write operation unit 212) of the write operation and also identifies the location of complement data 216 within the target write operation unit. For example, the storage information may indicate that the new data segment 214 is 512 B in length and is to be written to the target write operation unit 212 (e.g., a 4096-byte (4-KiB) sector) at a starting offset of 512 bytes from the beginning of the target write operation unit 212. In this example, the complement data 216 consists of all data in the target write operation unit 212 associated with byte offsets 0 to 511 and 1024 to 4095.

Responsive to receipt of the write command, the storage device 201 accesses the target write operation unit and reads complement data 216 of the associated write operation into the volatile memory buffer 203. The complement data 216 is copied from the volatile memory buffer 203 to the complement data read cache 218. After the complement data 216 and the new data segment 214 are both saved in their respective non-volatile cache locations, the storage device 201 executes the write command to the target write operation unit (e.g., the write operation unit 212). If power is unexpectedly lost while executing the write command, one or more data cells in the target write operation unit may be lost or damaged.

If damaged, the storage device 201 can repair the target write operation unit by accessing the data saved in the write cache 208 and the data saved in the complement data read cache 218.

In one example restore operation, the storage device 201 retrieves the complement data 216 from the complement data read cache 218 and arranges the complement data 216 adjacent to null placeholder data (e.g., "dummy data 220") within the volatile memory buffer 203, as illustrated by data string 230. For example, the dummy data 220 may be sized to match the size of the data in the new data segment 214 and positioned relative to the complement data 220 in the same manner as data of the new data segment 214 is to be positioned relative to the complement data 220. The storage device 201 then retrieves the new data segment 214 from the write cache 208 and inserts the new data segment 214 in place of the dummy data 220, creating a modified write allocation unit 232. The modified write allocation unit 232 can then be copied back to the write allocation unit 212 within the main store 204. A variety of other restore operations are also contemplated.

The complement data read cache 218 can also be used as a source for populating the volatile memory buffer 203 prior to the write operation if the complement data 216 is removed from the volatile memory buffer 203 after the write to the complement data read cache 218 and before the write operation.

Figure 3:
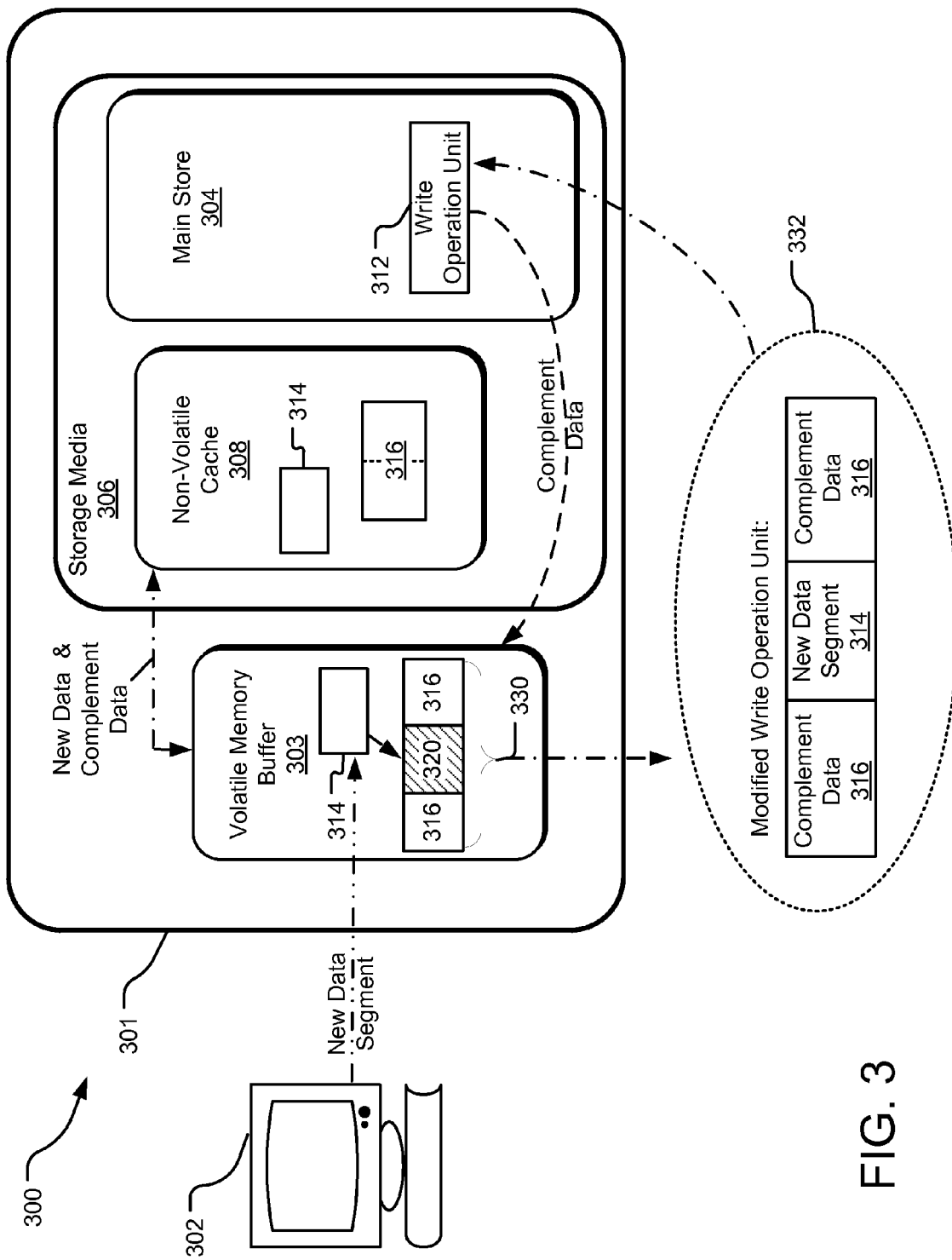
FIG. 3 illustrates example operations of another system that preserves complement data during unexpected power loss events.

FIG. 3 illustrates example operations of another storage system 300 that preserves complement data during unexpected power loss events. The storage system 300 includes a host computer 302 communicatively coupled to a storage device 301 and further including a storage media 306. The storage device 301 reads and writes data to the storage media 306 in write operation units (e.g., a write operation unit 312).

Storage space on the storage media 306 includes a main store 304 used for storing user data. The storage device 301 also includes a non-volatile cache 308 that operates as both a write cache and a complement data read cache. The non-volatile cache 308 is a storage area that is either on the storage media 306 or on another non-volatile memory accessible by the storage device 301. The host computer sends the storage device 301 a write command that specifies a new data segment 314 and associated storage information. The storage device 301 copies the new data segment 314 to the non-volatile cache 308 and uses the storage information to identify a target write operation unit (e.g., the write operation unit 312) on the storage media 306 where the new data segment 314 is directed. For example, the storage device 301 may use an LBA specified by the host computer 302 to identify a target sector on the storage media 306. The storage device 301 then identifies and reads complement data 316 of the write command from the write operation unit 312 into the non-volatile memory buffer 303.

After identifying and retrieving complement data 316 associated with the write command, the storage device 301 copies the complement data 316 into the non-volatile cache 308 and executes the write command to the target write operation unit (e.g., the write operation unit 312). If an unexpected power failure occurs during execution of the write command, data in the write operation 312 may be damaged. However, the damaged write operation unit 312 can be later recreated and restored by retrieving copies of the complement data 316 and the new data segment 314 from the non-volatile cache 308.

In one example restore operation, the complement data 316 is read into the non-volatile memory buffer 303. Within the volatile memory buffer 303, the null placeholder data (e.g., "dummy data 320") is inserted between or appended to one or more strings of the complement data 316 (as shown by the data string 330). The dummy data 320 is sized to match the size of the new data segment 314 and positioned relative to the complement data 316 in the same manner as the new data segment 314 is positioned relative to the complement data 316 within the write operation unit 312. In one implementation, insertion of the dummy data 320 is performed by a caching module that also retrieves the complement data 316 from the write operation unit 312.

The storage device 301 then retrieves the new data segment 314 from the write cache 308 and inserts the new data segment 314 in place of the dummy data 320, creating a modified write allocation unit 332. The modified write allocation unit 332 can then be copied back to the write allocation unit 312 within the main store 304.

In another implementation, the modified write operation unit 332 is created and saved in the non-volatile cache 308 prior to initial execution of the write operation. In this case, restoring the write operation unit 312 entails retrieving the modified write operation unit 332 from memory and writing it to the write operation unit 312 within the main store 304.

In FIG. 3 the modified write operation unit 332 includes the new data segment 314 adjacent to two segments of the complement data 316. However, it should be understood that in other implementations, the modified write operation unit 332 may include multiple new data segments 314 separated from one another by segments of the complement data 316. For example, the write command may specify multiple new data segments 314 that are non-contiguous and directed to a same write operation unit 312. In such case, the complement data 316 retrieved by the storage device 301 may include more than two separate segments of the complement data 316. When the multiple segments of new data are aggregated together with the complement data 316 to form the modified write operation unit 332, the resulting modified write operation unit 332 includes multiple segments of the new data 314 separated from one another by multiple segments of the complement data 316.

In the illustrated implementation, the complement data 316 and the new data segment 314 are both saved in the same general storage area (e.g., the non-volatile memory cache 308) on the storage device 301 If the non-volatile memory cache 308 is a single contiguous storage region including both new data segments and complement data, then the implementation of FIG. 3 can reduce the time delay associated with restoring data following an unexpected power loss event. This is due to the fact that an actuator arm may not have to perform an extra seek operation to access the complement data 316 and the new data segment 314 from two non-overlapping and non-adjacent regions on the disk.

Restoration of data affected by a power loss may be performed differently in different implementations, depending on design criteria. In some implementations, damaged or incomplete write allocation units are discovered and repaired during normal cleaning operation of the non-volatile cache 308.

Figure 4:
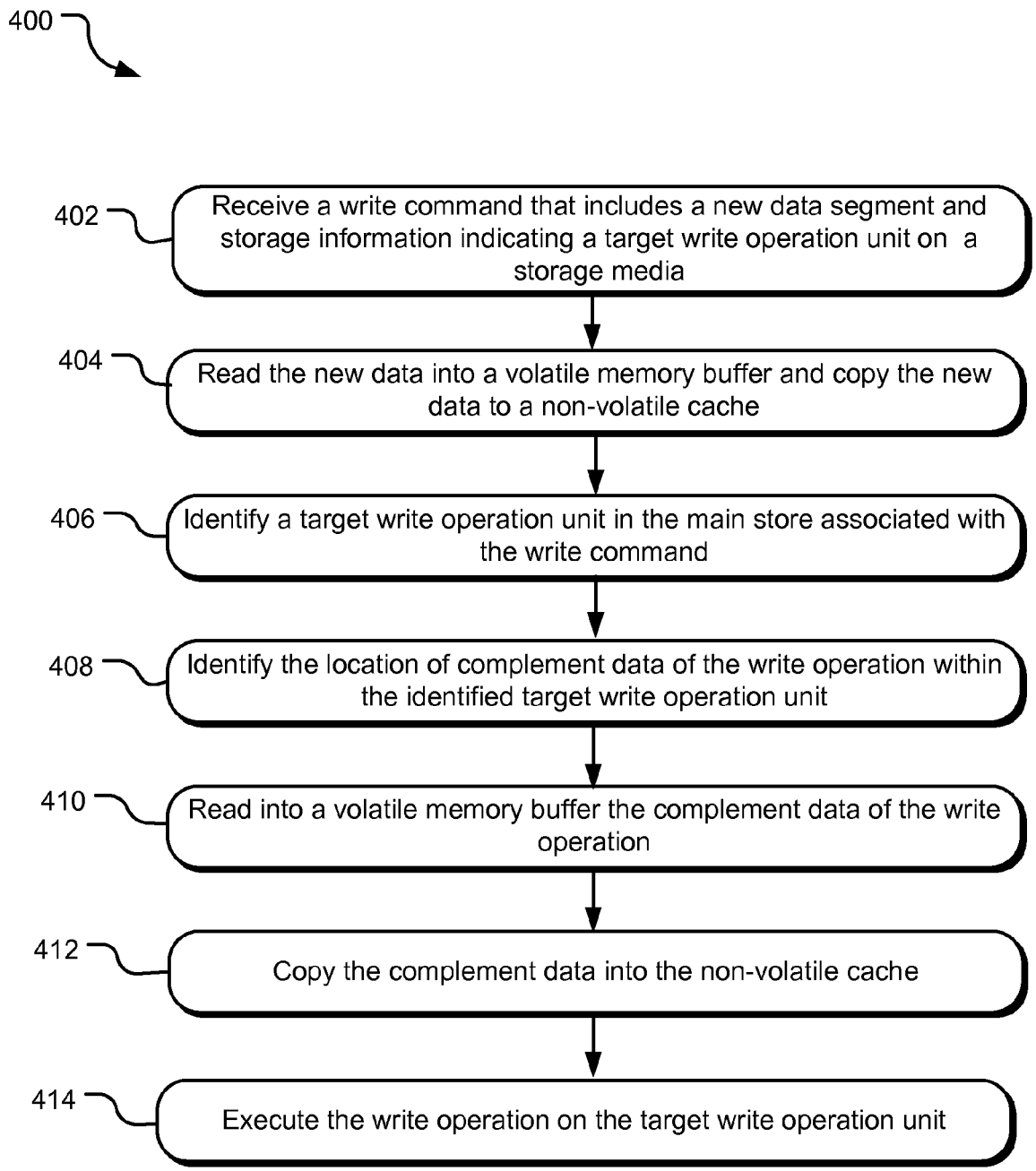
FIG. 4 illustrates example operations for caching data to preserve data during unexpected power loss events that occur while writing data to a storage device.

In other implementations, restoration of torn or incomplete write allocation units is periodically performed, such as following an unexpected power loss when power is restored. For example, the data in the target write operation unit 312 may be checked against the data recently cached in the non-volatile cache 308. Metadata preserved in the non-volatile cache 308 may allow the storage device 301 to identify the target write operation unit and to compare the recently cached data (e.g., the new data segment 314 and the complement data 316) to data within the target write operation unit. If the data in target write operation unit and the recently cached data are similar enough to satisfy a predetermined match criterion, restoration of the target write operation unit is not performed. However, if the data in the target write operation unit and the cached data are sufficiently different and the predetermined match criterion is not satisfied, the data in the target write operation unit of the main store 304 is restored by fetching the new data segment 314 and complement data 316 from the non-volatile cache 308 and using this as the data source for a write operation to the target write operation unit. FIG. 4 illustrates example operations 400 for caching and preserving complement data t during unexpected power loss events that occur while writing data to a storage device. A receiving operation 402 receives a write command that specifies one or more new data segments and storage information indicating a set of data blocks on a storage media. A reading and copying operation 404 reads the new data segment(s) into a volatile memory buffer and then copies the new data segment(s) to a non-volatile cache that is separate from a main store of the storage device. The non-volatile cache may be located on the same or a different physical storage medium as the main store.

An identification operation 406 uses the storage information specified by the write command to identify a target write operation unit in the main store where the new data segment(s) are directed or addressed. Another identification operation 408 identifies the location of complement data within the target write operation unit. A reading operation 410 reads the complement data from the target write operation unit into the volatile memory buffer, and a copying operation 412 copies the complement data (either alone, or in aggregation with the new data segment(s) to the non-volatile cache). In one implementation, the copying operation 412 also stitches together the complement data and the new data segment(s) and saves the resulting data string in the non-volatile cache. An execution operation 414 executes the write command to modify the data of the target write operation unit.

In yet another implementation, the identification operation 406 identifies multiple target write operation units including data to be updated by a number of different write commands received from a host device. The reading operation 410 reads the complement data from each of the identified target write operation units in a single batch read operation. The copying operation 412 copies the complement data of the multiple write operation units to a non-volatile cache in a single batched write operation. The execution operation 414 then executes the write commands to update each of the target write operation units.

If power is unexpectedly lost during execution of the write command, the cached data stored in the non-volatile cache can be used to restore the data of the target write operation unit. In one implementation, data of the target write operation unit is restored during normal cache-to-main store cleaning operations. For example, when cleaning out the non-volatile cache, cached data may be compared to associated write operation units in the main store. In this manner, "torn," (e.g., incomplete or damaged) write operation units can be discovered and repaired using data from the non-volatile cache. In another implementation, a restore operation may execute upon power-on of a storage device, such as when the storage device detects that the power loss was unexpected.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   reading, from a storage medium in a storage device, data associated with a received write command; and
   caching at least a portion of the read data to a non-volatile data cache of the storage device prior to writing new data specified by the write command to a main store, the cached data in the non-volatile data cache including complement data and excluding data that is modified by the new data during execution of the write command;
   inserting dummy data between two segments of the complement data;
   aggregating, within a volatile memory buffer, the new data specified by the write command with the cached data from the non-volatile data cache, wherein aggregating includes overwriting the dummy data with the new data within the volatile memory buffer; and
   writing the aggregated data to the main store of the storage device.

2. The method of claim 1, wherein the reading operation further comprises reading the data from a write operation unit of the storage medium to be modified with the new data specified by the write command.

3. The method of claim 2, wherein the write operation unit is a contiguously readable portion of a data band between a first updated data block and an end of the data band in a shingled magnetic recording system.

4. The method of claim 2, wherein the write operation unit is a number of radially overlapping and non-contiguous data sectors within a data band of a shingled magnetic recording system.

5. The method of claim 2, wherein the write operation unit is an erasure block of a Flash storage device.

6. The method of claim 2, wherein the write operation unit is a data band in a shingled magnetic recording system.

7. The method of claim 1, further comprising:
   identifying multiple write operation units of the storage medium that are to be updated with new data specified by a plurality of received write commands;
   reading complement data from each of the identified write operation units, the complement data being data that is not updated by any of the write commands;
   caching, in a single batched write operation, the complement data of the write commands to a non-volatile data cache of the storage device prior to writing new data specified by the write commands to a main store.

8. The method of claim 1, further comprising:
   copying new data specified by the write command into a write cache.

9. The method of claim 8, wherein the write cache is the non-volatile data cache.

10. The method of claim 9, wherein the non-volatile data cache is included in an overprovisioned area of the storage medium.

11. The method of claim 8, wherein the write cache is separate from the non-volatile data cache.

12. A system comprising:
    a processor;
    memory; and
    a caching module stored in memory and executable by the processor to:
      identify a target write operation unit on a storage media of a storage device, the target write operation unit associated with new data specified by a write command from a host device,
      retrieve data from the target write operation unit,
      store at least a portion of the retrieved data in a non-volatile data cache, the stored data in the non-volatile data cache including complement data and excluding data modified by the new data during execution of the write command;
      insert dummy data between two segments of the complement data;
      aggregate, within a volatile memory buffer, the new data specified by the write command with the stored data from the non-volatile data cache, wherein aggregating includes overwriting the dummy data with the new data within the volatile memory buffer; and
      write the aggregated data to the target write operation unit.

13. The system of claim 12, wherein the target write operation unit and the non-volatile cache are located on a same magnetic media of the storage device.

14. A computer-readable storage media encoding a computer program for executing a computer process on a computer system, the computer process comprising:
   absorbing into a non-volatile data cache a new data segment specified by a write command received at a storage device;
   reading complement data from a storage media of the storage device prior to writing the new data segment to a main store; and
   copying the complement data to the non-volatile data cache of the storage device without copying data that is to be modified by the new data segment during execution of the write command;
   inserting dummy data between two segments of the complement data;
   aggregating, within a volatile memory buffer, the new data specified by the write command with the cached data from the non-volatile data cache, wherein aggregating includes overwriting the dummy data with the new data within the volatile memory buffer; and
   writing the aggregated data to the main store of the storage device.

15. The computer-readable storage media of claim 14, wherein the non-volatile data cache is not located on the storage media.

* * * * *